United States Patent [19]

Hulse et al.

[11] Patent Number: 5,791,756
[45] Date of Patent: Aug. 11, 1998

[54] DISTRIBUTED LIGHTING SYSTEM

[75] Inventors: George Robert Hulse, Cookeville, Tenn.; Ronald Owen Woodward, Yorktown, Va.

[73] Assignee: Cooper Industries, Inc., Houston, Tex.

[21] Appl. No.: 697,930

[22] Filed: Sep. 3, 1996

[51] Int. Cl.[6] ............................................. F21V 8/00
[52] U.S. Cl. ........................... 362/32; 362/277; 362/321; 385/19; 385/39
[58] Field of Search ........................ 385/18, 19, 39, 385/901; 349/1; 40/547; 362/32, 280, 277, 319, 321

[56] References Cited

U.S. PATENT DOCUMENTS

| | | | |
|---|---|---|---|
| 2,507,909 | 5/1950 | Kaysen | 362/32 |
| 3,683,167 | 8/1972 | Rishton | 362/32 |
| 3,767,910 | 10/1973 | Harrigan | 362/32 |
| 3,962,702 | 6/1976 | Kriege | 385/901 |
| 4,222,091 | 9/1980 | Bartenbach | 362/32 |
| 4,428,029 | 1/1984 | Baliozian | 362/32 |
| 4,945,457 | 7/1990 | Yazdani et al. | 362/32 |
| 5,053,765 | 10/1991 | Sonehara et al. | 362/32 |
| 5,436,805 | 7/1995 | Hsu et al. | 362/32 |
| 5,584,558 | 12/1996 | Nath | 362/32 |

FOREIGN PATENT DOCUMENTS

| | | | |
|---|---|---|---|
| 113293 | 4/1990 | Japan | 40/547 |

OTHER PUBLICATIONS

Hulse et al., "Three Specific Design Issues Associated with Automotive Distributed Lighting Systems; Size Efficiency, and Reliability," SAE Technical Paper Series 960492, SAE International, International Congress & Exposition, Detroit, Michigan, Feb. 26–29, 1996, pp. 1–7.

*Primary Examiner*—Alan Cariaso
*Attorney, Agent, or Firm*—Fish & Richardson, P.C.

[57] ABSTRACT

A distributed lighting system has a light source and a set of optical conduits. Input ends of the set of optical conduits may be placed in close proximity to the light source to increase the efficiency with which light is transmitted from the light source to the optical conduits. The efficiency also may be increased by placing a light collector between the light source and the input ends of the optical conduits.

14 Claims, 9 Drawing Sheets

DISTRIBUTED LIGHTING SYSTEM

BACKGROUND OF THE INVENTION

The invention relates to distributed lighting systems.

Distributed lighting systems distribute light from one or more light sources in central locations to one or more remote locations. A distributed lighting system promises several advantages over conventional lighting techniques, including low power consumption, extended life, heat reduction where the light is emitted, and increased design flexibility.

SUMMARY OF THE INVENTION

The invention provides a highly efficient distributed lighting system for use, for example, in an automobile. Issues associated with incorporating a distributed lighting system into an automobile are discussed by Hulse, Lane, and Woodward in *Three Specific Design Issues Associated with Automotive Distributed Lighting Systems: Size, Efficiency and Reliability*, SAE Technical Paper Series, Paper No. 960492, which was presented at the SAE International Congress and Exposition, Detroit, Mich., Feb. 26–29, 1996, and is incorporated herein by reference.

In one aspect, generally, the invention features a distributed lighting system having a light source and a set of optical conduits. Input ends of the set of optical conduits are placed in close proximity to the light source to increase the efficiency with which light is transmitted from the light source to the optical conduits.

Embodiments of the invention may include one or more of the following features. The ends of the optical conduits may be placed within five millimeters from the light source to increase the efficiency of light transfer. The efficiency may be increased even further by placing the ends of the optical conduits within one millimeter from the light source. However, to permit replacement of the light source without replacing the optical conduits, the conduits are not permanently attached to the light source. The optical conduits may be made from glass or heat-resistant plastic to prevent melting of the conduits due to the significant heat that may be generated in such close proximity to the light source. For example, the optical conduits may be glass or quartz rods, glass or plastic waveguides, or glass or plastic optical fibers. When the optical conduits are glass or quartz rods, glass or plastic wave guides or optical fibers may be attached to ends of the optical conduits that are not next to the light source. The light source may be a high-intensity discharge lamp.

A specialized fixture may be provided to place the ends of the optical conduits in proximity with the light source. The fixture may define a multi-sided, substantially spherical shape. Each side of the fixture may include an opening that accommodates an optical conduit. The fixture may be formed from a single piece of heat-resistant material such as aluminum.

A light modulator such as a set of electro-mechanical shutters may be placed between the ends of the optical conduits and the light source. The shutters permit control of which conduits receive light from the light source. This in turn, permits control of where and when light is emitted by the distributed lighting system.

In another aspect, generally, the invention features a distributed lighting system having a light source, a set of optical conduits, and a light modulator such as an array of liquid crystal light valves (LCLVs) between the light source and the optical conduits.

Embodiments of the invention may include one or more of the features discussed above, as well as one or more of the following features. The light source may be surrounded by a number of trapezoidal collecting tubes having interior surfaces that are polished or coated with reflective material. These collecting tubes permit a large percentage of the light produced by the light source to reach the optical conduits, which may be arrayed in bundles at the end of each collecting tube. The collecting tubes improve the efficiency with which light is transferred to the optical conduits and obviate any need for focusing lenses to direct the light from the light source into the optical conduits. The collecting tubes also serve to space the optical conduits from the light source, which permits plastic optical fibers to be used as optical conduits without risk of melting.

Ends of the optical conduits may be fused together to form a planar surface having dimensions corresponding to dimensions of the array of LCLVs. Fusing the conduits together eliminates gaps between the ends of the conduits and thereby increases the efficiency with which the conduits collect light from the light source.

Other features and advantages of the invention will be apparent from the following detailed description, including the drawings, and from the claims.

DESCRIPTION OF THE PREFERRED EMBODIMENTS

Figure 1:
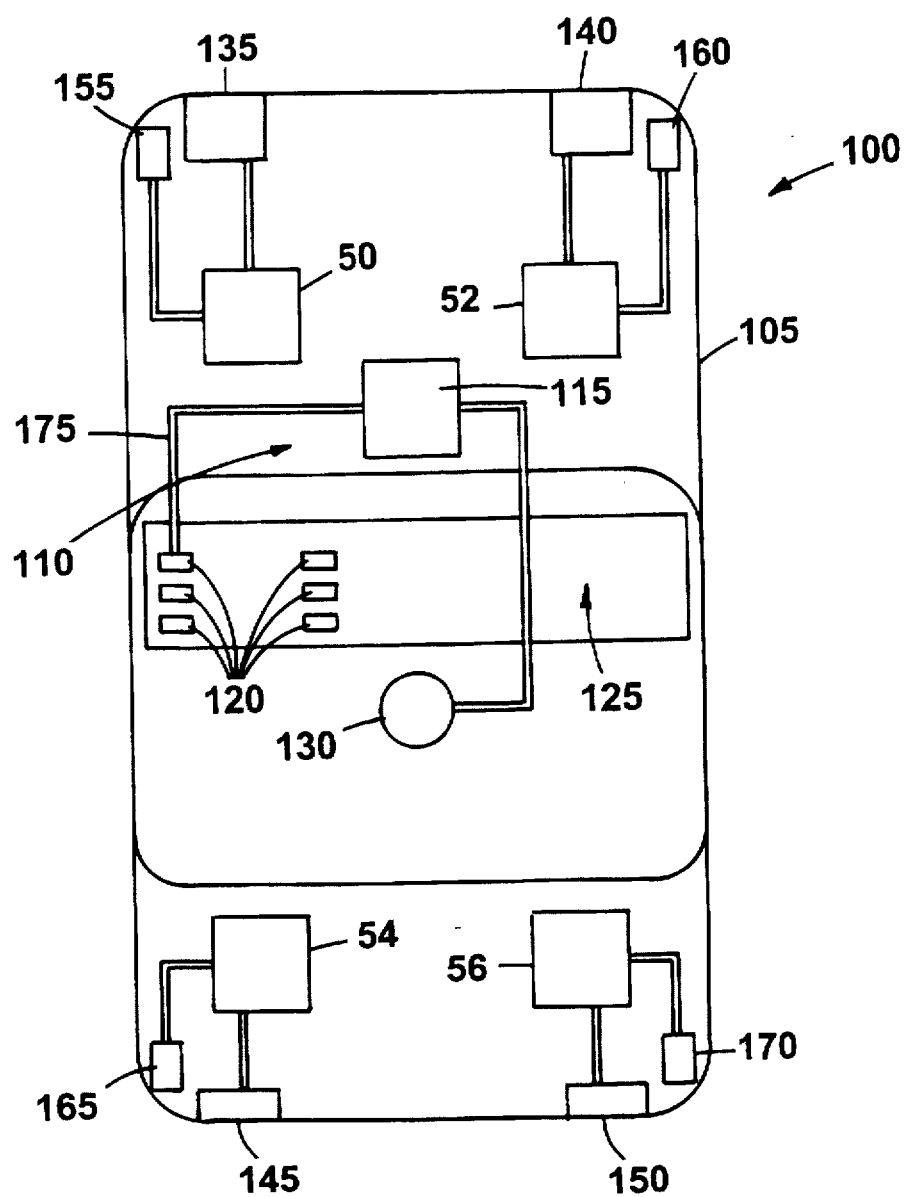
FIG. 1 is a block diagram showing orientation of components of a distributed lighting system in an automobile.

Referring to FIG. 1, a distributed lighting system (DLS) 100 may be installed in an automobile 105. The DLS may include several subsystems 110. Each subsystem distributes light from a light source, such as a high-intensity discharge (HID) lamp assembly 115, to one or more light emitters of the automobile. Light emitters include, for example, indicator lights 120 on the dashboard panel 125 of the automobile and cabin dome lights 130. Other subsystems of the DLS may distribute light to exterior light emitters, such as head lights 135, 140; tail lights 145, 150; and turn signals 155, 160, 165, and 170. As shown, the DLS includes several independent subsystems 110, each of which is connected to a subset of the vehicle's lights and includes a separate light source. The DLS also may be implemented using only a single light source.

Each subsystem 110 may include a HID lamp assembly 115 and optical conduits 175 that transmit light from the lamp assembly 115 to the light emitters. An optical conduit 175 may be, for example, a plastic or glass wave guide or a plastic or glass optical fiber. One suitable plastic fiber is large core, plastic optical fiber having a three millimeter diameter and covered with a half millimeter protective jacket. An optical conduit also may include a glass or quartz rod having a first end adjacent to a lamp of the lamp assembly and a second end connected to a glass or plastic optical fiber.

Figure 2:
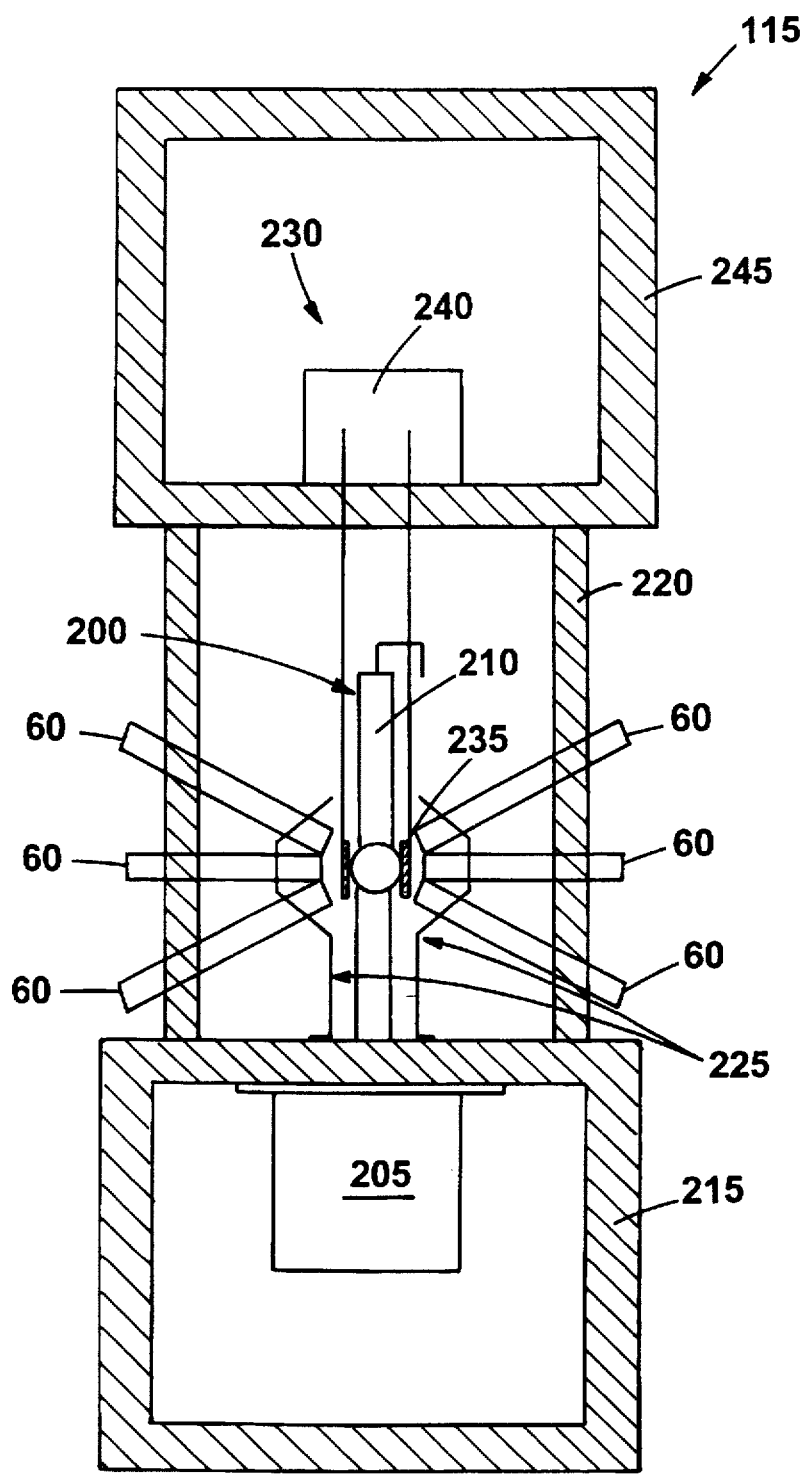
FIG. 2 is a block diagram of a lamp assembly of the distributed lighting system of FIG. 1.

FIG. 2 illustrates an implementation of a high-intensity discharge (HID) lamp assembly 115 as a light source in a DLS. The assembly 115 includes a HID lamp 200 having a base 205 and a bulb 210. The base is mounted in a housing 215, and the bulb 210 is enclosed by a housing 220.

The HID lamp 200 is surrounded by optical conduits 60. A fixture 225 holds the optical conduits in place, with an end of each optical conduit close to the bulb 210. In most instances, the ends of the optical conduits are within one to five millimeters from the bulb to increase the efficiency with which the conduits collect light emitted by the bulb. The ends of the optical conduits may contact each other. Due to the proximity of the ends of the optical conduits to the bulb, and the heat associated with the bulb, the optical conduits are implemented using glass rods having optical fibers or waveguides connected to the ends that are not positioned next to the bulb. Glass optical fibers or waveguides, or heat resistant plastic optical fibers or waveguides, also may be used.

The lamp assembly 115 also includes a mechanism 230 that controls whether light enters particular ones of the optical conduits 60. The mechanism 230 includes an array 235 of electro-mechanical shutters. A shutter corresponding to a particular optical conduit may be selectively opened or closed to control whether light enters the optical conduit. The shutters are controlled by solenoids 240 positioned in a housing 245 of the lamp assembly 115.

Figure 5:
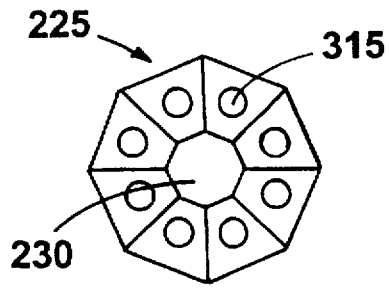
FIGS. 3–5 are views of a fixture of the lamp assembly of FIG. 2.
Figure 4:
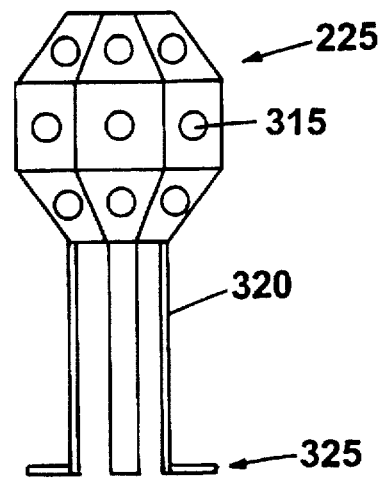
Figure 3:
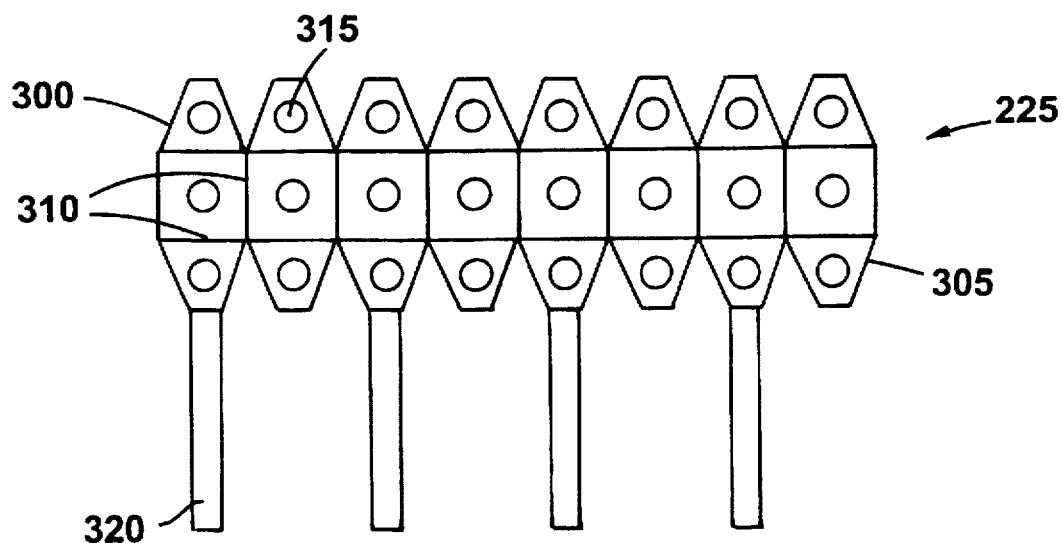

Referring also to FIGS. 3–5, the fixture 225 is formed from a sheet 300 of heat-resistant material, such as aluminum. The sheet is cut to have a desired outline 305. Thereafter, the sheet is folded along fold lines 310 to form the fixture 225. The fixture includes twenty-four holes 315, each of which is located on a side of the fixture and accommodates an optical conduit.

Four extensions 320 project from the bottom of the fixture 225 and are folded at their ends to form a pedestal 325. The pedestal 325 is used to attach the fixture 225 to the base 215 of the HID lamp 200. As shown in FIG. 5, the fixture 225 has an opening 230 at its top that permits the bulb of the HID lamp to extend out of the fixture. The opening 230 also permits insertion of the electro-mechanical shutters into the fixture 225.

Figure 6:
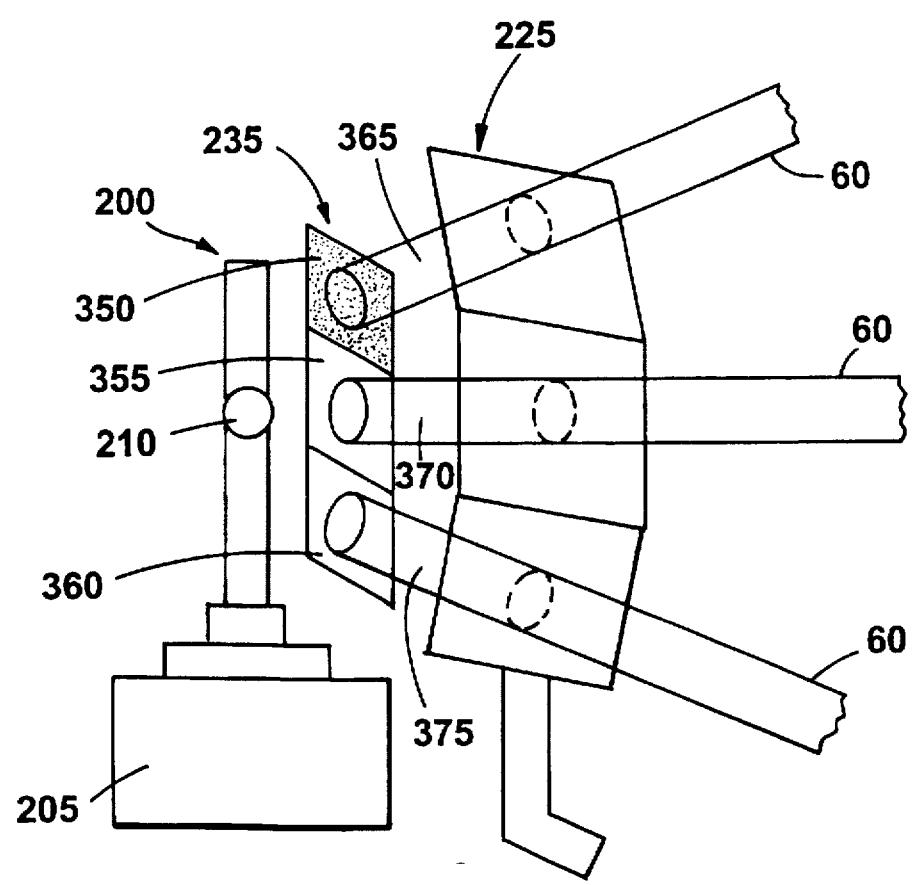
FIG. 6 is a block diagram illustrating operation of shutters of the assembly of FIG. 2.

FIG. 6 illustrates operation of the array 235 of electro-mechanical shutters. For ease of illustration, FIG. 6 shows three shutters 350, 355 and 360 that may be used to selectively control whether light produced by the HID lamp 200 enters associated optical conduits 365, 370 or 375. Actual implementations may include more shutters. For example, a typical automobile may require from 30 to 50 separately controlled optical conduits to provide interior lighting and about 13 optical conduits to provide exterior lighting.

The shutters are located at ends of the optical conduits closest to the HID lamp. This shutter position permits the optical conduits to be continuous, without any need for cutting or splicing optical conduits to install the shutter array. The shutter 350 is shown in the closed or "off" position. In this position, the shutter 350 prevents light from reaching the optical conduit 365. Shutters 355 and 360 are shown in the open or "on" position so that light passes through the shutters and reaches the optical conduits 370 and 375.

Figure 7:
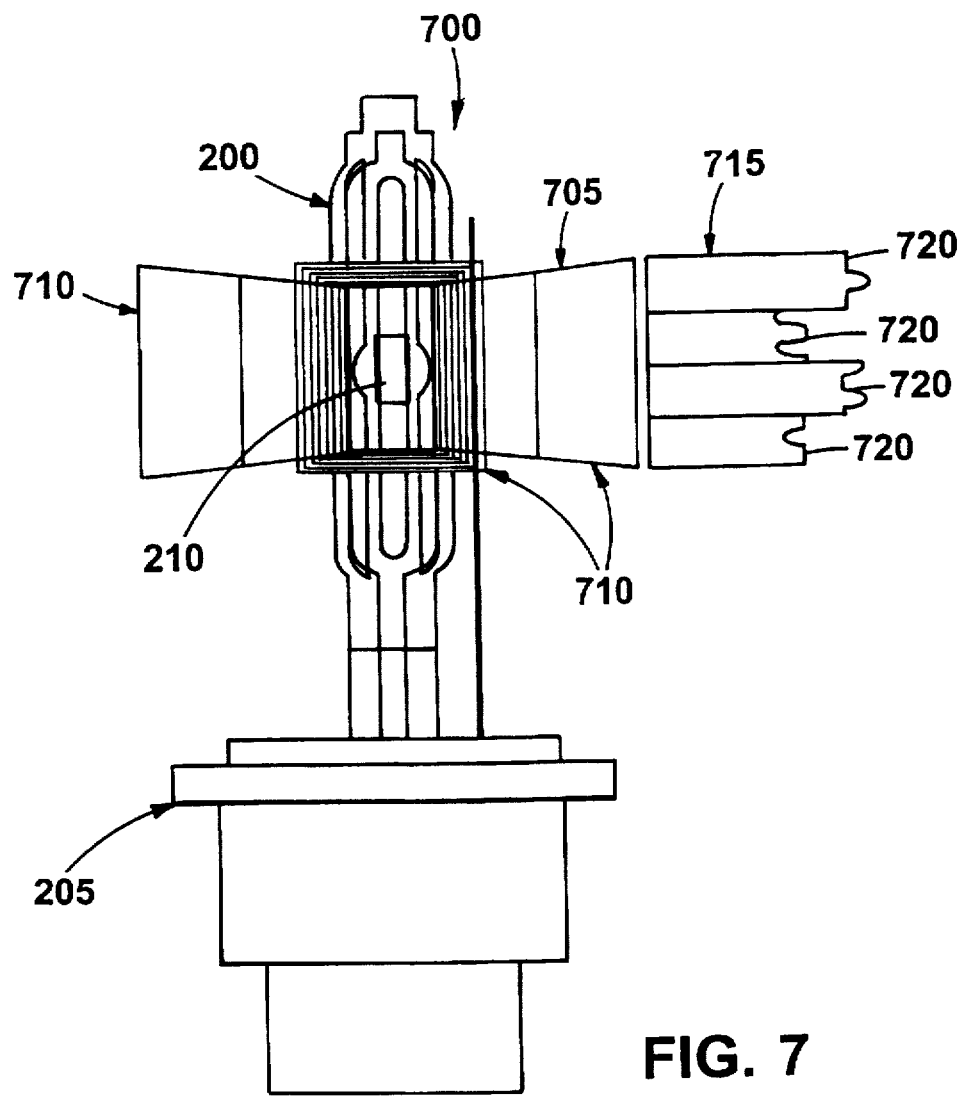
FIGS. 7 and 8 are side and top views of a lamp assembly.
Figure 8:
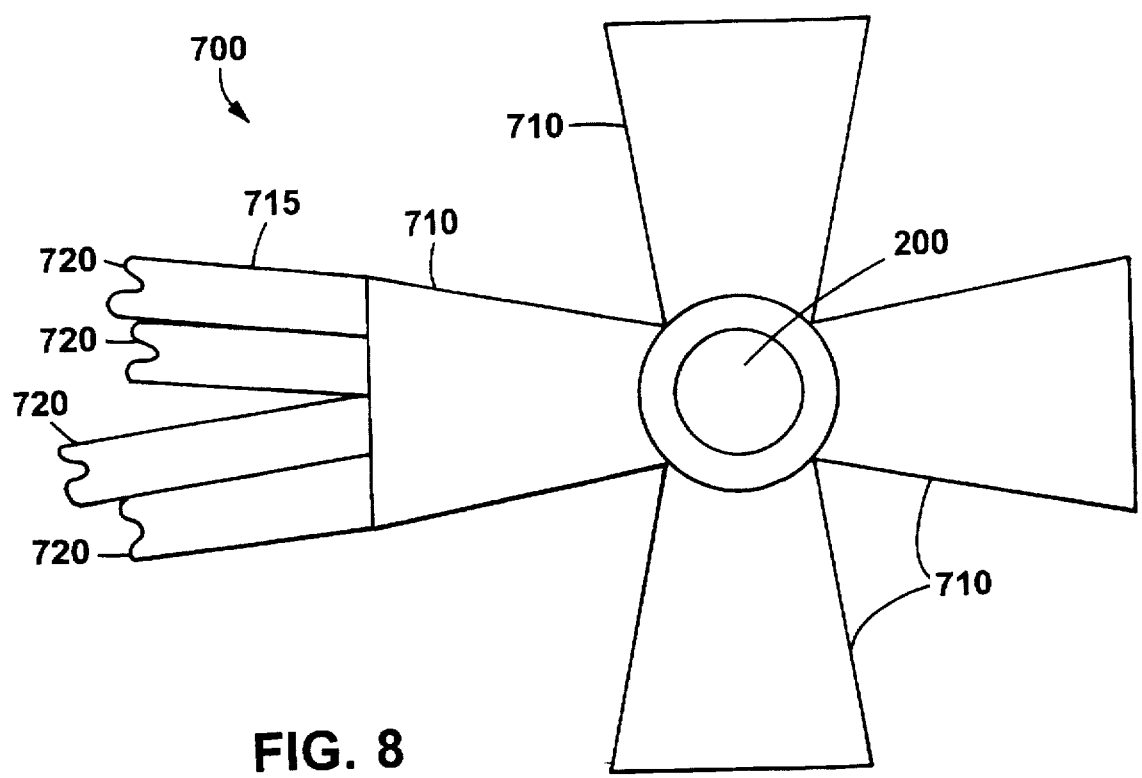

FIGS. 7 and 8 show another HID lamp assembly 700. Like the assembly 115, the assembly 700 includes a HID lamp 200 having a base 205 and a bulb 210. The HID lamp 200 provides light to an optics assembly 705. The optics assembly 705 includes four light collecting tubes 710. Each light collecting tube has a rectangular cross section that increases in size with increasing distance from the end closest to the HID lamp. Light collecting tubes having circular or other cross sections also could be used. A light collecting tube may be implemented using a hollow tube or a solid piece of glass or high temperature plastic having the same shape as the hollow tube. Interior surfaces of the light collecting tube are polished or covered with reflective material.

A light collecting tube directs light emitted by the lamp to a bundle 715 of optical conduits 720 positioned at the end of the tube that is furthest from the lamp. In addition to collecting the light, the light collecting tube changes the angle of the light so that the light meets the acceptance angle of the conduit.

Figure 9:
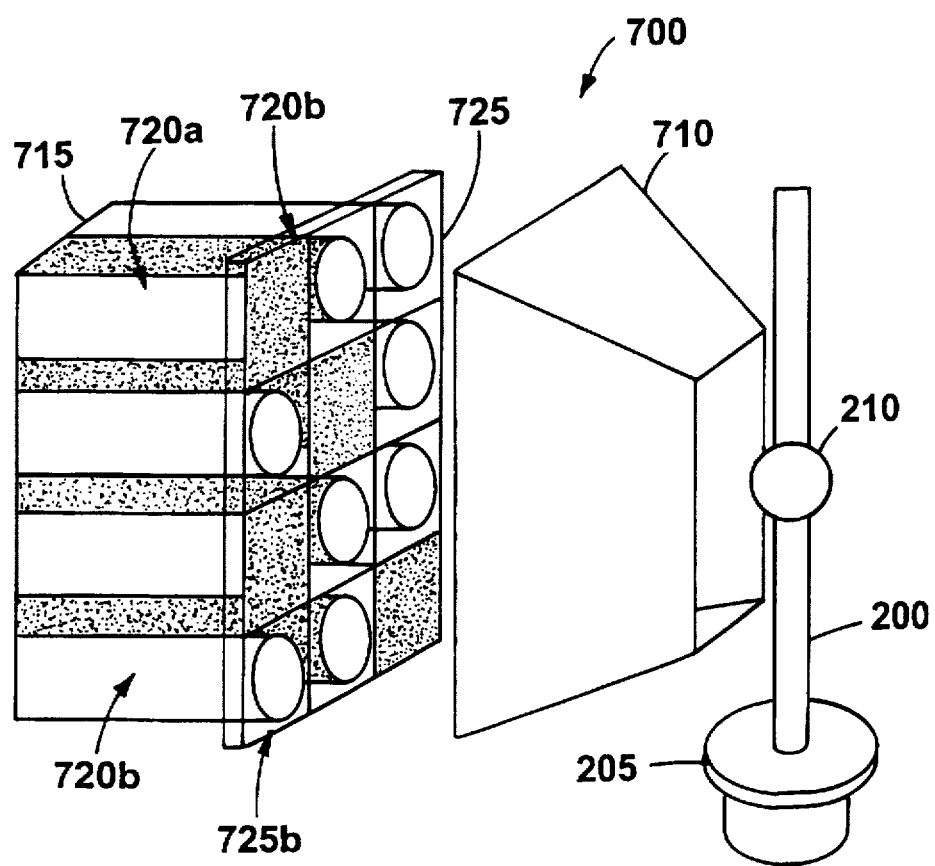
FIG. 9 is a block diagram illustrating operation of light controllers of the assembly of FIGS. 7 and 8.

Referring to FIG. 9, each light collecting tube 710 of the assembly 700 includes an array of liquid crystal light valves (LCLVs) 725 that modulate the light emitted by the HID lamp 200. The LCLVs 725 are located between the light collecting tube 710 and the bundle 715 of optical conduits 720. The LCLVs may be, for example, twisted nematic LCLVs. This type of LCLV is light-absorbing and is regularly used in applications such as wrist watch displays.

An LCLV 725a is shown in the closed or "off" mode. In this mode, the LCLV is nearly opaque and prevents most light from entering a corresponding optical conduit 720a. An LCLV 725b is shown in the open or "on" mode, in which the LCLV allows light to pass through the LCLV and enter a corresponding optical conduit 720b.

Figure 10A:
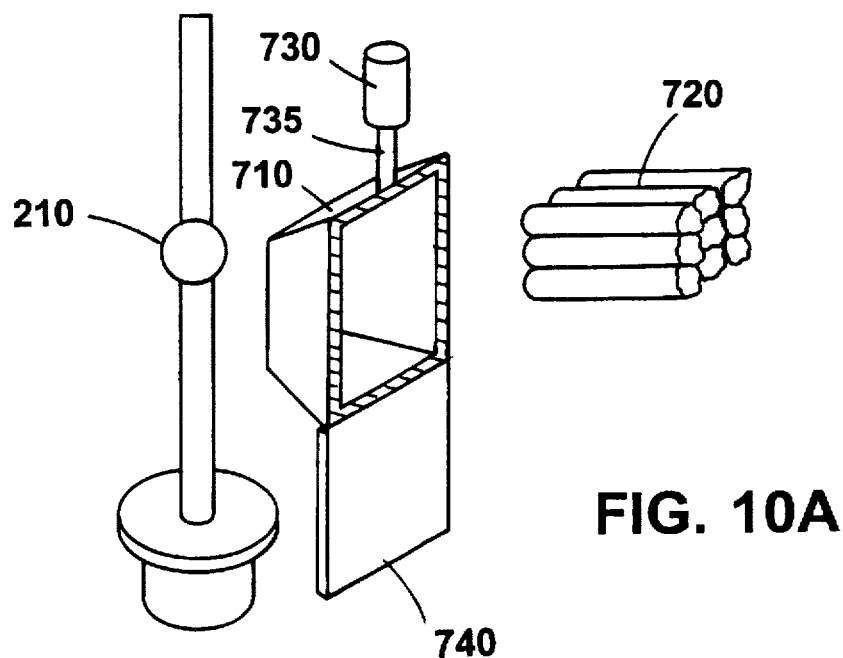
FIGS. 10A and 10B are perspective views illustrating operation of an alternative light controller for the assembly of FIGS. 7 and 8.
Figure 10B:
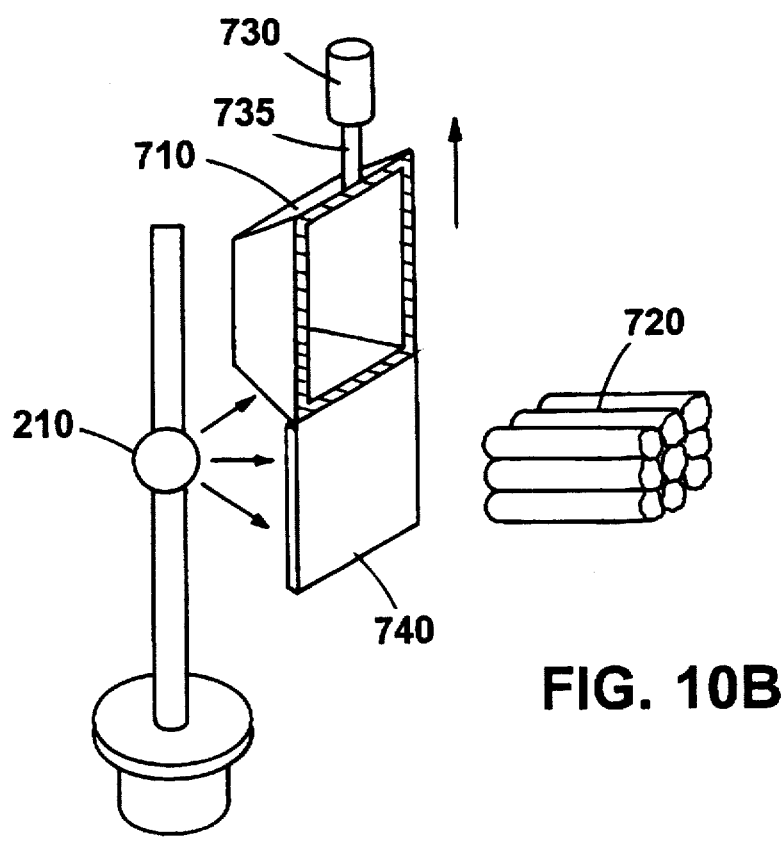

Referring to FIGS. 10A and 10B, an alternative modulation arrangement includes a device 730, such as a solenoid, connected to a light collecting tube 710 by a rod 735. A shutter 740 extends from the bottom of the light collecting tube 710. As shown in FIG. 10A, in a first configuration, the light collecting tube 710 is positioned between the bulb 210 and the optical conduits 720. In this configuration, the light collecting tube 710 directs light from the bulb 210 into the optical conduits 720.

When it is desired to prevent light from reaching the optical conduits 720, the device 730 is activated to move the light collecting tube 710 and the shutter 740 to the configuration shown in FIG. 10B. In this configuration, the light collecting tube 710 is no longer aligned with the optical conduits 720. Instead, the shutter 740 is positioned between the bulb 210 and the optical conduits 720. The shutter 740 is opaque and prevents light from reaching the optical conduits 720.

Figure 11:
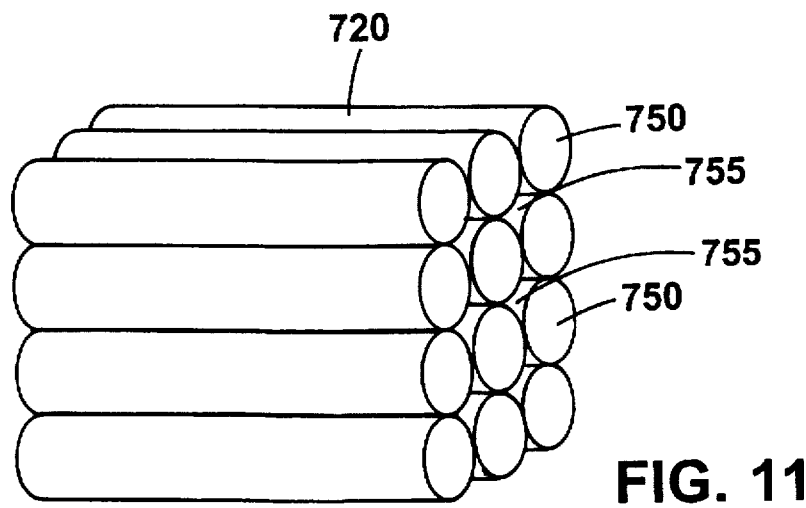
FIGS. 11 and 12 are perspective views of optical conduit ends.
Figure 12:
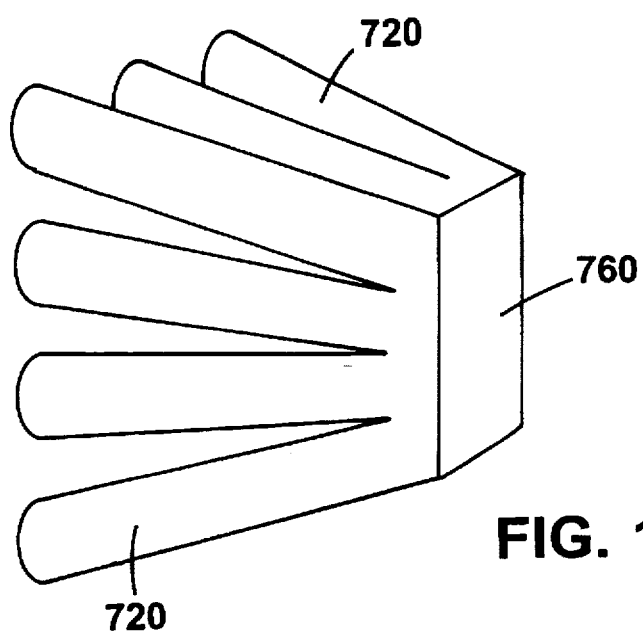

The optical conduits 720 may have generally circular cross-sections or may have other shapes. FIG. 11 shows a set of optical conduits placed next to each other. In this configuration, ends 750 of the optical conduits do not form a solid planar surface. Instead, gaps 755 are located between the conduits. Accordingly, a portion of the light emitted by the HID lamp (FIG. 7) passes into the gaps and is lost. As shown in FIG. 12, the ends 750 of the optical conduits 720 may be fused together to form a solid planar surface 760 that eliminates the gaps (FIG. 11) between the optical conduits and improves the light collecting efficiency thereof.

Other embodiments are within the scope of the following claims. For example, a hybrid system may employ electro-mechanical shutters to modulate conduits associated with exterior lighting while providing electronic modulators such as LCLVs to modulate conduits associated with interior lighting as well as conduits associated with some exterior lighting such as, for example, turn signals. Electro-mechanical shutters provide complete transmission of light when open and complete blockage of light when off, but may have higher maintenance requirements than electronic modulators. By contrast, LCLVs are relatively inefficient transmitters. Since this inefficiency is not a problem for interior lighting, it may be useful to employ LCLVs for this purpose while using electro-mechanical shutters for exterior lighting.

What is claimed is:

1. A distributed lighting system comprising:

a light source, optical conduits having input ends and emission ends and being unattached to the light source, a fixture configured to hold the input ends of the optical conduits and to place the input ends of the optical conduits in proximity with the light source, the fixture defining a multi-sided, three dimensional shape having a first side and a second side opposite the first side, the fixture being positioned so that the light source is between the first and second sides, and a light modulator positioned between the light source and the input ends of the optical conduits to selectively control transmission of light from the light source to the input ends of the optical conduits, wherein the input ends of the optical conduits are placed in close proximity to the light source to increase the efficiency with which light is transmitted from the light source to the optical conduits, and each of the first and second sides of the fixture includes an opening that accommodates one of the optical conduits;

the light modulator comprises a set of electro-mechanical shutters; and a first electro-mechanical shutter is associated with a first optical conduit and a second electro-mechanical shutter is associated with a second optical conduit.

2. The distributed lighting system of claim 1, wherein the input ends of the optical conduits are placed within five millimeters from the light source.

3. The distributed lighting system of claim 2, wherein the input ends of the optical conduits are placed within one millimeter from the light source.

4. The distributed lighting system of claim 1, wherein the optical conduits comprise glass rods.

5. The distributed lighting system of claim 1, wherein the optical conduits comprise optical wave guides.

6. The distributed lighting system of claim 1, wherein the optical conduits comprise optical fibers.

7. The distributed lighting system of claim 1, wherein the light source comprises a high intensity discharge lamp.

8. The distributed lighting system of claim 1, wherein each side of the fixture includes an opening that accommodates an optical conduit.

9. The distributed lighting system of claim 1, wherein the fixture is formed from a single piece of material.

10. A distributed lighting system comprising:

a light source, optical conduits having input ends and emission ends, a light collector movable between a first position in which the light collector is between the light source and the input ends of the optical conduits and transmits light therebetween, and a second position in which the light collector is not between the light source and the input ends of the optical conduits, and an actuator configured to move the light collector between the first position and the second position.

11. The distributed lighting system of claim 10, further comprising a shutter connected to the light collector, wherein the shutter is positioned between the light source and the input ends of the optical conduits when the light collector is in the second position.

12. The distributed lighting system of claim 10, wherein the light collector includes a reflective inner surface.

13. The distributed lighting system of claim 10, wherein the input ends of the optical conduits are fused together to form a planar surface.

14. The distributed lighting system of claim 13, wherein the optical conduits comprise glass rods.

* * * * *